(12) United States Patent
Shanan

(10) Patent No.: US 8,666,343 B2
(45) Date of Patent: Mar. 4, 2014

(54) DC-OFFSET-CORRECTION SYSTEM AND METHOD FOR COMMUNICATION RECEIVERS

(75) Inventor: Hyman Shanan, Douglas (IE)

(73) Assignee: Analog Devices, Inc., Norwood, MA (US)

(*) Notice: Subject to any disclaimer, the term of this patent is extended or adjusted under 35 U.S.C. 154(b) by 457 days.

(21) Appl. No.: 12/559,970

(22) Filed: Sep. 15, 2009

(65) Prior Publication Data

US 2010/0075624 A1 Mar. 25, 2010

Related U.S. Application Data

(60) Provisional application No. 61/097,125, filed on Sep. 15, 2008.

(51) Int. Cl.
*H04B 17/00* (2006.01)
*H04B 1/18* (2006.01)
*H04B 1/10* (2006.01)

(52) U.S. Cl.
USPC .............. 455/226.1; 455/67.13; 455/283; 455/296

(58) Field of Classification Search
USPC .......... 455/63.1, 67.13, 241.1, 225.1–226.4, 455/245.2, 251.1, 253.1–253.2, 296, 455/226.1–226.4, 283, 298, 310
See application file for complete search history.

(56) References Cited

U.S. PATENT DOCUMENTS

| | | | |
|---|---|---|---|
| 6,166,668 A * | 12/2000 | Bautista et al. | 341/118 |
| 6,498,929 B1 * | 12/2002 | Tsurumi et al. | 455/296 |
| 6,516,187 B1 | 2/2003 | Williams et al. | |
| 6,560,447 B2 | 5/2003 | Rahman et al. | |
| 6,625,232 B1 | 9/2003 | Tilley | |
| 6,735,422 B1 * | 5/2004 | Baldwin et al. | 455/232.1 |
| 6,862,439 B2 * | 3/2005 | Feng | 455/234.1 |
| 6,903,606 B1 * | 6/2005 | Yan et al. | 330/9 |
| 6,985,711 B2 * | 1/2006 | Holenstein et al. | 455/312 |
| 7,076,225 B2 * | 7/2006 | Li et al. | 455/245.1 |
| 7,221,918 B1 | 5/2007 | Grasbeck et al. | |
| 7,313,376 B1 | 12/2007 | Hietala | |
| 7,319,852 B2 * | 1/2008 | Schlegel et al. | 455/324 |
| 7,365,662 B2 | 4/2008 | Marsili et al. | |
| 7,512,171 B2 * | 3/2009 | Barnes et al. | 375/130 |
| 7,764,748 B2 * | 7/2010 | Okuni et al. | 375/316 |
| 7,933,361 B2 * | 4/2011 | Huang et al. | 375/316 |
| 2002/0123320 A1 * | 9/2002 | Lisenbee | 455/296 |
| 2004/0013083 A1 * | 1/2004 | Sobchak et al. | 370/203 |
| 2005/0164639 A1 * | 7/2005 | Suissa et al. | 455/63.1 |
| 2005/0248478 A1 * | 11/2005 | Ling | 341/118 |
| 2005/0258989 A1 * | 11/2005 | Li et al. | 341/120 |
| 2006/0073803 A1 * | 4/2006 | Igarashi et al. | 455/296 |

(Continued)

OTHER PUBLICATIONS

"AD6548 Othello-G Complete GSM/GPRS Transceiver," product description published by Analog Devices Inc. in 2005 [retrieved Aug. 11, 2010]. Retrieved from the Internet: <<http://search.analog.com/search/default.aspx?query=AD6548&local=en >>, 2 pages.

(Continued)

*Primary Examiner* — Simon Nguyen

(74) *Attorney, Agent, or Firm* — Knobbe, Martens, Olson & Bear, LLP

(57) ABSTRACT

Static and dynamic DC offsets in receivers may be cancelled in two stages using a digitally implemented offset-correction loop.

49 Claims, 10 Drawing Sheets

(56) References Cited

U.S. PATENT DOCUMENTS

| | | | |
|---|---|---|---|
| 2006/0227910 A1* | 10/2006 | Ramasubramanian et al. | 375/346 |
| 2007/0072571 A1* | 3/2007 | Sun et al. | 455/280 |
| 2008/0165899 A1* | 7/2008 | Rahman et al. | 375/319 |
| 2009/0093228 A1* | 4/2009 | Rostami et al. | 455/284 |
| 2009/0135970 A1* | 5/2009 | Miyagi et al. | 375/345 |
| 2009/0258626 A1* | 10/2009 | Yamada et al. | 455/253.2 |
| 2009/0264090 A1* | 10/2009 | Ivonnet et al. | 455/233.1 |

OTHER PUBLICATIONS

Cheung, K., "Analog Devices Improves Othello Radio for 3G TD-SCDMA Wireless Handset," published by EDA Geek on Jul. 12, 2010 [retrieved Aug. 11, 2010]. Retrieved from the Internet: <<http://edageek.com/2007/07/12/othello-3t-ad6552/>>, 3 pages.

Magoon et al., "A single-chip quad-band (850/900/1800/1900 MHz) direct conversion GSM/GPRS RF transceiver with integrated VCOs and fractional-$N$ synthesizer," IEEE Journal of Solid State Circuits, vol. 37, No. 12, Dec. 2002, 11 pages.

Perraud et al., "A direct-conversion CMOS transceiver for the 802.11a/b/g WLAN standard utilizing a Cartesian feedback transmitter," IEEE Journal of Solid State Circuits, vol. 39, No. 12, Dec. 2004, 13 pages.

Vassiliou et al., "A single-chip digitally calibrated 5.15-5.825GHz 0.18μm CMOS transceiver for 802.11.a Wireless LAN," IEEE Journal of Solid-State Circuits, vol. 38, No. 12, Dec. 2003, 11 pages.

"WiMAX/WiBro RF MxFE Transceiver—AD9352," product description published by Analog Devices Inc. in 2005 [retrieved Aug. 11, 2010]. Retrieved from the Internet: <<http://www.analog.com/en/rfif-components/rfif-transceivers/ad9352/products/product.html>>, 2 pages.

* cited by examiner

① STATIC DC OFFSET CORRECTION STAGE
② DYNAMIC OFFSET CORRECTION STAGE

DC-OFFSET-CORRECTION SYSTEM AND METHOD FOR COMMUNICATION RECEIVERS

CROSS-REFERENCE TO RELATED APPLICATION

This application claims priority to and the benefit of U.S. Provisional Patent Application No. 61/097,125, filed Sep. 15, 2008, which is hereby incorporated herein by reference in its entirety.

FIELD OF THE INVENTION

Embodiments of the invention relate to systems and methods for receiving electronic or electromagnetic signals, and, in particular, to communication receiver circuits for cancelling static and dynamic DC offsets.

BACKGROUND

Wireless communication receivers are used in applications such as wireless sensor networks, point-to-point data links, mobile phones, wireless local area networks, mobile WiMAX, mobile wireless infrastructure, and data-streaming applications. Receivers designed for such applications desirably feature very low power consumption (e.g., less than 15 mW), very small die area, very low cost (e.g., less than $1), and increasingly higher levels of integration of their digital signal processing functions. These characteristics permit the deployment of very-large-scale battery-operated networks of devices implementing such applications. A direct-conversion receiver is one possible implementation of a wireless communication receiver that may possess at least some of these characteristics. A direct-conversion receiver can lower power consumption by down-converting an incoming wireless signal directly to the base-band, thereby allowing the base-band filtering chain to operate at frequencies lower than otherwise possible. A direct-conversion receiver also offers superior receiver-blocking resilience due to the absence of any image-rejection constraints, which are common in other receiver architectures, such as low-intermediate-frequency receivers.

Unfortunately, direct-conversion receivers may also suffer from certain drawbacks. For example, a DC offset introduced into the direct-conversion receiver may cause the receiver to perform sub-optimally by, for example, preventing a signal from being received or degrading the receiver's dynamic range. There are two kinds of DC offsets: static and dynamic. A static DC offset may be caused by circuit mismatches in the receiver's circuits, or by the local oscillator self-mixing at the inputs of the receiver's mixer. A dynamic, time-varying offset may be caused by the local-oscillator signal radiating proximate to the receiver. The dynamic time-varying offset can change unpredictably over time with an unidentifiable amplitude and frequency. The local-oscillator signal may be radiated by the receiver itself and reflect back to it from nearby surfaces, thereby self-mixing in the direct-conversion receiver mixer stage. In addition, a similar modulated local oscillator signal may be caused by a nearby transmitter operating on the same channel as the receiver, particularly if both the receiver and transmitter operate in an unlicensed, uncontrolled radio frequency (RF) band, such as the Industrial, Scientific, and Medical Band. This transmitted modulated local oscillator signal may mix with the local oscillator of the receiver in the receiver mixer stage. Another source of a dynamic, time-varying offset is coupling of the local-oscillator signal to the inputs of the low-noise amplifier at the receiver input. Due to the high gain of the low-noise amplifier, the coupled local-oscillator signal may be amplified to a level sufficient to self-mix in the direct-conversion mixer stage.

Dynamic DC offsets should be cancelled while the desired signal is being received, and previous implementations of direct-conversion receivers have utilized limited offset-cancellation circuitry. These implementations, however, are generally unsuitable for low-cost, low-power wireless applications. Some implementations, for example, employ analog DC offset-correction circuitry, which may be too large, consume too much power, and/or require too much time to cancel the DC offsets. Other implementations correct only for static DC offsets, or do not continually re-calibrate their corrections, thereby ignoring dynamic time-varying offsets. Finally, some implementations do not account for changes in dynamic DC offsets in the presence of gain changes in a receiver's front-end low-noise amplifier. Clearly, a need exists for receivers that offer extremely low power consumption, very small silicon area, and fast and efficient cancellation of static and dynamic DC offsets.

SUMMARY

The present invention provides, in various embodiments, system and methods for cancelling static and/or dynamic DC offsets in receiver circuits using one or more offset-correction loops (OCLs) which operate more rapidly and/or use lower-cost hardware than prior implementations.

A receiver circuit, as the term is used herein, is an electronic device capable of extracting a signal from an incoming electromagnetic wave or electric current. Such devices include both wireless and wired communication receivers, including, but not limited to, mobile phones, wireless local area networks, cable modems, fiber optical receivers, or analog front-end receivers. Much of the functionality of the offset-correction loop may be implemented with digital circuitry and algorithms, i.e., with only minimal analog circuitry. As a result, the power consumption of the offset-correction loop circuitry is easier to scale down with supply voltage, operation frequency, and process geometries. In addition, digital implementations may have a small silicon area and generate less noise.

In various embodiments, the offset-correction loop compensates for the two types of DC offsets in two major stages. In the first stage, any static DC offsets are cancelled. In the second stage, any dynamic offsets are cancelled, while the static offset-correction determined in the first stage is maintained. This division of DC offset compensation may reduce the complexity of the digital-to-analog converters (DACs) used in the system—specifically, their resolution and dynamic range—because the offset-correction loop system may need only a low-resolution DAC to compensate for static DC offsets in the first stage while tracking and cancellation of dynamic offsets may require a high-resolution DAC. Dividing the DC offset-correction into two stages may also facilitate using various circuit design techniques and algorithms that speed up the cancellation of the dynamic DC offsets. The term "cancellation" is used herein synonymously with "reduction" of the offset, and does not necessarily imply complete elimination of the offsets. Preferably, the offset is reduced to a value significantly below the signal level, e.g., 98% below the signal level.

In certain embodiments of digital offset-correction loops in accordance with the invention, a digital integrator detects a DC offset at an analog-to-digital converter (ADC) output of the receiver. The output of the integrator is passed through a digital gain element, which may be implemented, e.g., using bit-shifting operations. The output of the digital gain element, in turn, acts as an input to a DAC, whose output is combined with the receiver RF mixer output. The DAC output (at least partially) cancels the DC offsets present in the receiver. This closed-loop circuit effectively presents a high-pass frequency characteristic for the signal being received. The bandwidth of the high-pass frequency characteristic is set by the digital gain element at the integrator output. Changing the value of this digital gain element changes the bandwidth of the high-pass frequency characteristic and hence changes the speed of the offset-correction loop. In certain embodiments, the bandwidth of the offset-correction loop is adjusted in response to the level of the DC offsets to reduce the time needed for DC offset cancellation.

Accordingly, the invention provides, in a first aspect, a method for cancelling an offset in a receiver circuit, using an offset-correction loop, by cancelling a static offset during a first cancellation stage and a dynamic offset during a second cancellation stage (which follows the first cancellation stage). To cancel the offset, an analog signal may be converted to a digital signal. The method may involve disabling an input of the receiver circuit during the first cancellation stage, and enabling the input of the receiver circuit before entering into the second stage. A static offset-correction determined in the first cancellation stage may be maintained in the second stage.

The method may further include controlling a bandwidth of the offset-correction loop by adjusting a feedback path gain, which may be based, at least in part, on a magnitude of the offset. Thus, a time period associated with cancelling the offset and/or an acquisition time of an incoming wireless signal may be reduced. Cancelling the dynamic offset may, moreover, include adjusting a feedback path gain of the offset-correction loop based, at least in part, on a change in a feed-forward gain of the receiver, and/or compensating for an estimated change in the dynamic offset due to a change in a low-noise amplifier (LNA) gain. Cancellation of the dynamic offset may be done continuously by using a sigma-delta DAC. In some embodiments, the dynamic offset is cancelled during a preamble of a received signal.

In a second aspect, the invention is directed to a system for cancelling an offset in a receiver using an offset-correction loop. Embodiments of the system may include an offset-correction circuit for cancelling a static offset of the receiver during a first cancellation stage and a dynamic offset of the receiver during a second cancellation stage, and a controller for effecting a transition of the offset-correction circuit from the first cancellation stage to the second cancellation stage. The controller may base the transition, at least in part, on a magnitude of the offset. Further, the offset-correction circuit may include circuitry for controlling the bandwidth of the offset-correction loop. For example, the offset-correction circuit may include a multiplier (which may, in some implementations, be a divider), such as, e.g., a bit shifter, for adjusting a feedback path gain of the offset-correction loop, thereby controlling the bandwidth. The adjustment of the bandwidth and/or feedback path gain may be based, among other things, on the magnitude of the offset and/or on a change in a feed-forward path gain of the receiver.

In some embodiments, the system includes two DACs, one for cancelling the static offset and another for cancelling the dynamic offset. The first DAC may have a lower effective resolution than the second DAC. A receiver base-band channel filter may be utilized for filtering out-of-band quantization noise of the second DAC.

A third aspect of the invention relates to a method for cancelling an offset in a receiver using an offset-correction loop. Embodiments of the method include converting an analog output signal of the receiver to a digital signal; integrating the digital signal; measuring a magnitude of a digital offset level in the digital signal; scaling the integrated digital signal based at least in part on the magnitude of the digital offset level, thereby changing a bandwidth of the offset-correction loop; converting the scaled integrated digital signal to an analog offset-correction signal; and combining the analog offset-correction signal with the input signal, thereby cancelling at least a portion of the offset in the receiver. The method may further include filtering out-of-band quantization noise in the analog offset-correction signal. In some embodiments, the method involves interleaving the in-phase (I) and quadrature (Q) channels of the receiver by alternately cancelling an offset in the I channel and the Q channel.

Scaling the integrated digital signal may be accomplished, for example, by bit-shifting. Measuring the magnitude of the digital offset level in the digital signal may include measuring a moving average of the digital signal and, further, comparing the moving average with a predetermined value to determine a degree of scaling. Scaling the integrated digital signal may be based on a change in the feed-forward gain of the receiver. The integrated signal may further be adjusted based on an estimated change in the dynamic offset caused by a change in a gain of an LNA. The bandwidth of the offset-correction loop may be widened when adjusting the integrated digital signal to account for an error in the estimate.

In a fourth aspect, embodiments of the invention provide a system for cancelling an offset in a receiver which includes an ADC for converting an analog output signal of the receiver to a digital signal; an integrator for integrating the digital signal, thereby producing an integrated digital signal; an averaging circuit for computing an average of the digital signal; a programmable gain element for scaling the integrated digital signal based at least in part on the average; a DAC for converting the scaled integrated digital signal into an analog offset-correction signal; and an adder for combining the analog offset-correction signal with an input signal of the receiver, thereby cancelling at least a portion of the offset in the receiver. The system may further include a receiver base-band channel filter for filtering out-of-band quantization noise of the DAC.

The programmable gain element may be a bit shifter or other multiplier. In some embodiments, the programmable gain element scales the integrated digital signal based, at least in part, on a signal from an automatic gain control unit. The averaging circuit may include a moving average filter. Further, it may have a window comparator for comparing an output of the moving average filter with a predetermined value to determine a degree of scaling of the integrated digital signal. The adder may be or include a trans-impedance amplifier. In certain embodiments, the system further includes a sigma-delta modulator at the input of the DAC, which may be a third-order modulator and/or an error-feedback modulator. An input signal of the sigma-delta modulator may be scaled to prevent saturation of the sigma-delta modulator.

In a fifth aspect, the invention provides a wireless communication receiver comprising a receiver circuit for receiving a wireless radio-frequency input signal and down-converting it to a base-band frequency. Embodiments of the receiver include an offset-correction circuit for cancelling a static offset of the receiver during a first cancellation stage and a dynamic offset during a second stage following the first; and a controller for effecting a transition of the offset-correction circuit from the first to the second stage. The wireless communication receiver may, for example, be used in a mobile phone, a wireless local area network, or a wireless sensor network.

BRIEF DESCRIPTION OF THE DRAWINGS

The foregoing will me more readily understood from the following detailed description of the invention in conjunction with the drawings, in which.

DETAILED DESCRIPTION

Figure 1:
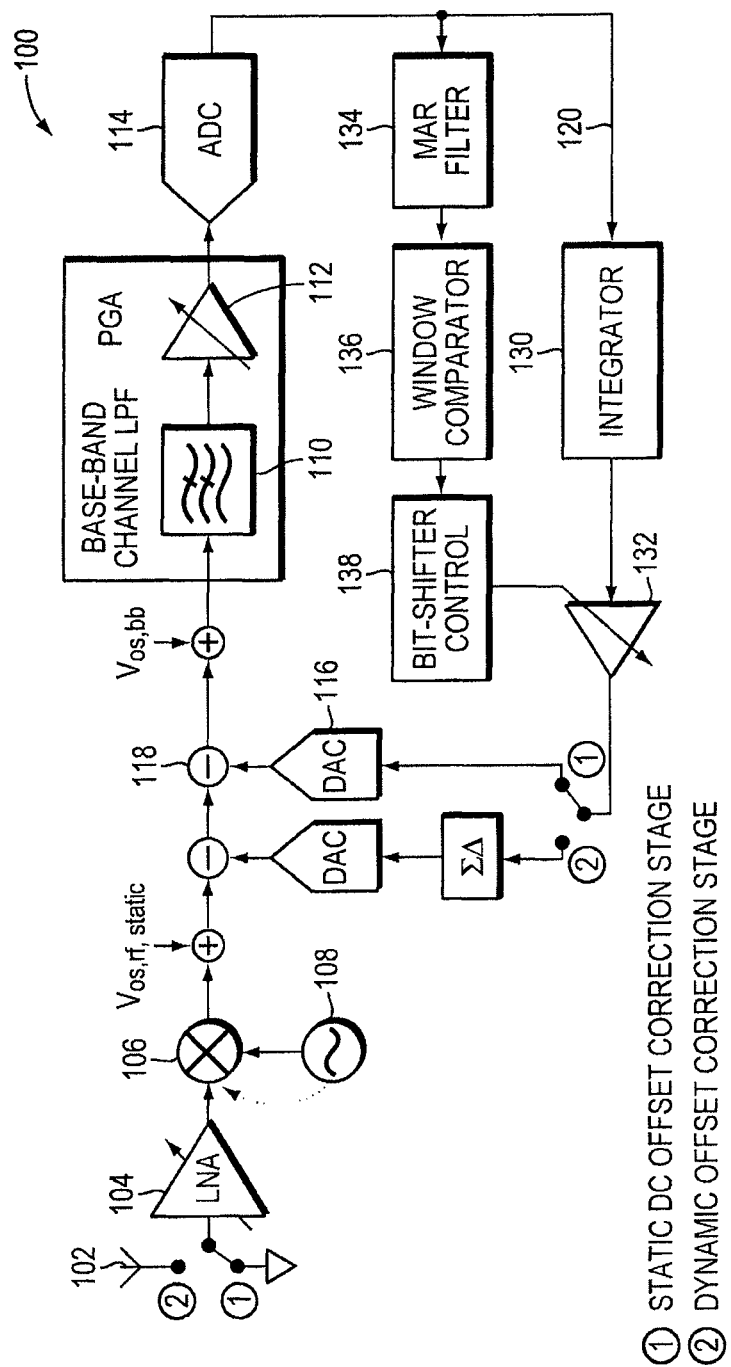
FIG. 1 is a block diagram illustrating a receiver circuit and offset-correction loop during static-offset correction in accordance with one embodiment.

Embodiments of the invention are, generally, directed to various systems and methods for correcting DC offsets in wireless or wired communication receiver systems. For example, such offset-correction systems and methods may be advantageously employed in a direct-conversion radio receiver circuit, as illustrated in FIG. 1. The exemplary receiver circuit 100 includes an antenna 102 for receiving an RF signal, and an LNA 104 that amplifies the signal. A mixer 106 combines the RF signal with an input signal from a local oscillator (LO) 108, whose frequency is typically tuned to the center frequency of the RF signal frequency, and sends the output through a base-band channel filter 110, where the desired signal is extracted. The output signal of the filter 110 is subsequently amplified in a programmable gain amplifier (PGA) 112.

In practice, static and dynamic DC offsets are often inadvertently introduced in the receiver. The static offset may include, for example, an offset $V_{os,bb}$ in the base-band filter, and an offset $V_{os,rf}$ resulting from the on-chip coupling between the RF and local oscillator ports of the RF mixer 106, which is a consequence of the finite isolation between these ports. The dynamic offset $V_{os,rf}$ (see FIG. 4) may be due to LO radiation and reflection back to the receiver input, as well as due to co-channel signals. To cancel these offsets in receiver circuit 100, an output signal of the PGA 112 may be fed back into the input port of the base-band filter 110, after passing through an offset-correction loop (as described in greater detail below). In various embodiments in which the offset-correction loop is implemented digitally, the analog PGA output signal is, for that purpose, converted to a digital signal in an ADC 114, and the corrected signal is then converted back into an analog signal in a DAC 116 before being combined with the receiver input signal in an adder 118.

The direct-conversion receiver 100 may be optimized to minimize power consumption. For example, while the receiver is idle, it may be powered up only periodically to search for an incoming wireless signal. Once the receiver is powered up, the offset-correction loop desirably cancels static and dynamic DC offsets in the shortest possible time such that the receiver spends most of the power-up time searching for an incoming wireless signal, which, in turn, reduces the average power consumption of the receiver over time.

Different wireless standards may define a signal's preamble—a non-data-bearing portion at the beginning of the wireless signal—which provides a window of time for a receiver to detect and synchronize to the incoming signal. During the preamble, an automatic-gain control (AGC) system may adjust the receiver's LNA and PGA gains to compensate for fluctuations in the incoming signal strength. A shorter preamble may result in less overhead in the incoming data payload, but also means that there is less time for the receiver to adjust its AGC circuitry. A wireless receiver system should be able to identify and lock onto a preamble before the time period defined by the preamble has expired.

To shorten the time needed for DC offset correction, the offset-correction loop may correct for DC offsets as fast as the stability of the offset-correction loop allows. For example, it may increase an offset-correction signal in larger steps as long as the offset level is high, and reduce the step size as the offset diminishes. In some embodiments, the offset-correction loop dynamically controls its bandwidth, and thereby its speed, according to the detected DC offset levels as well as the current LNA gain step. The bandwidth may be adjusted by bit-shifting operations in the feedback path 120 of the (primarily digital) offset-correction loop, typically, in a range from about 100 Hz to about 1500 kHz. As detailed further below, the bandwidth-adjustment mechanism may result in a bandwidth independent of any changes in the gain of the PGA 112 in the feed-forward path. These techniques, which may have a very small hardware and power-consumption overhead, can significantly reduce the time required for the DC offset cancellation and, consequently, also the power consumed by the entire receiver during signal acquisition.

The offset-correction loop may operate continuously and in parallel with the AGC system during the wireless signal reception. This parallel operation may pose significant challenges relating to the interaction between the AGC updates and the DC offsets being cancelled. For example, short signal-acquisition times and short transmitter-to-receiver turn-around times, defined by the communication standards of a particular wireless protocol, may require a fast settling time for the offset-correction loop. The offset-correction loop may be required to cancel any new DC offset introduced by, for example, an LNA gain change, before the AGC system reacts. If the offset-correction loop responds more slowly than the AGC system, the AGC may inadvertently adjust the gain of the system based on the value of a DC offset, not based on the value of the actual incoming signal.

The settling time of the offset-correction loop may be reduced using a method of fast cancellation of the dynamic DC offsets that occur due to self-mixing of the local oscillator signal in the receiver mixer stage after passing through the LNA. The method involves estimating and compensating for the effect that an LNA gain change will have on the offset-correction loop. As a result, the output of the offset-correction loop may initially be moved closer to the correct dynamic DC offset target, which significantly reduces the settling time of the offset-correction loop. In addition, the bandwidth of the offset-correction loop may be momentarily widened, e.g., with a bit-shifting operation, to allow for an even faster settling time, because the widened bandwidth may have a greater tolerance for an incorrect prediction of the effect of the LNA gain change.

The receiver may include a high-resolution DAC for continuous offset-correction. To reduce the silicon area required by the DAC, it may be based on, for example, a third-order sigma-delta current-steering design. This implementation may feature an effective resolution of at least 14 bits. The implementation of the offset-correction loop may also aid in eliminating flicker noise from the system by filtering it through its feedback loop.

In preferred embodiments, the offset-correction loop first cancels the static portion of the overall offset, and next the dynamic portion. Several hardware components of the offset-correction loop may be utilized in both of these cancellation stages. A controller may effect a transition between the two stages, which are described in more detail in the following sections.

1. Static Offset-Correction Stage

Referring again to FIG. 1, the offset correction loop may include, in addition to the ADC 114 and DAC 116, an integrator 130, a programmable digital gain element 132, a moving-average ("MAR") filter 134, and a window comparator 136. While the figure shows only one base-band channel of the receiver, many receivers utilize in-phase and quadrature (I and Q) channels. In some embodiments, the offset-correction loop may operate on both of these channels. For example, a switch at the output of the PGA 112 may interleave the I and Q channels, so that the offset-correction loop alternates between cancelling an offset in the I channel and cancelling an offset in the Q channel. In alternative embodiments, two offset-correction loops may be used—one for each receiver channel.

FIG. 1 illustrates the offset-correction loop in the static-offset-cancellation stage. If an undesired signal of a relatively high power level appears at the input of the receiver during this stage, the receiver output may saturate. This saturation may cause the offset-correction loop to fail cancelling the static DC offset (because the offset-correction loop will not be able to distinguish between the static DC offset and the DC offset arising due to the saturation of the receiver). To prevent this type of failure, the LNA is typically grounded and the receiver disabled during the static DC offset-correction stage, as shown in FIG. 1. As a result, most of the RF power appearing at the receiver input is reflected back.

In one embodiment, offset cancellation involves integrating the output of the ADC 114 using the digital integrator 130. The output of the digital integrator 130 may be scaled by programmable digital gain element 132, which is, generally, a digital multiplier or divider (which terms are, in the following, used synonymously). In certain embodiments, element 132 is a bit shifter, which shifts the bits of the digital value of the integrator output, thereby implementing a divide or a multiply operation with powers of 2. The digital feedback gain (e.g., the amount of bit shifting) may be varied to set the unity-gain frequency of the digital integrator. Since the unity-gain frequency, in turn, influences the high-pass filter corner (HPFC) of the closed-loop transfer function of the offset-correction loop, the HPFC may be controlled by adjusting the digital feedback gain of gain element 132.

Figure 2A:
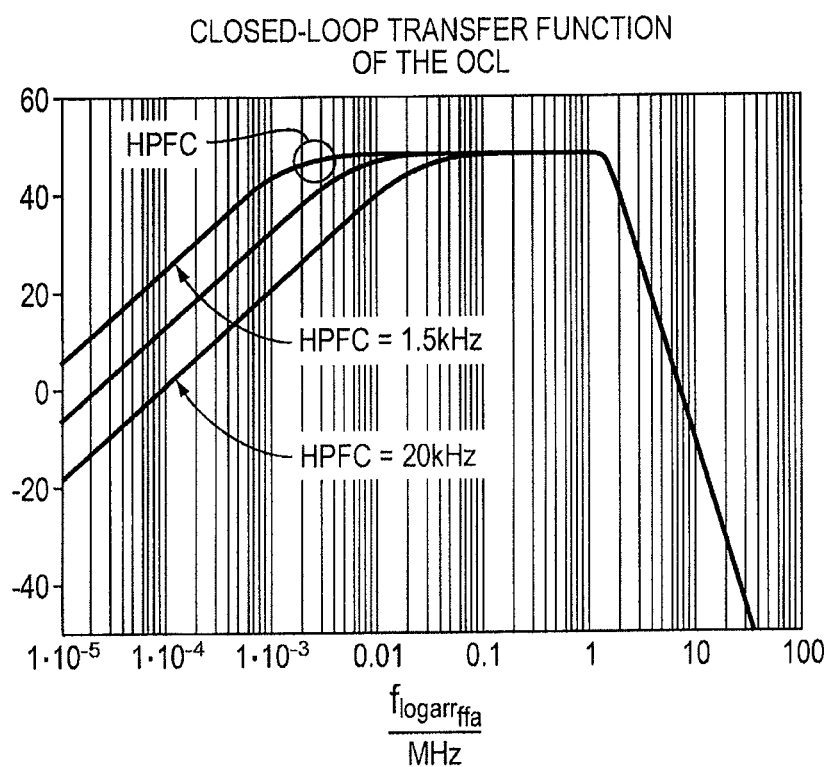
FIGS. 2A and 2B are graphs illustrating the effect of a change in the feedback path gain and simultaneous changes in the feedback and feed-forward path gains of an offset-correction loop in accordance with one embodiment on the transfer function of the loop.
Figure 2B:
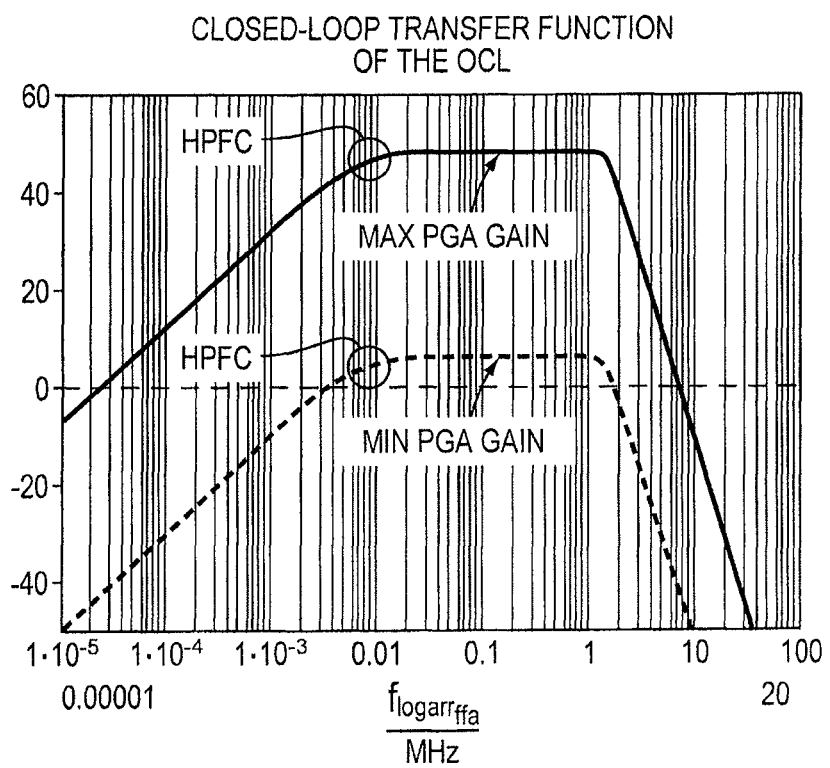

FIG. 2A illustrates the effect of the bit-shifting operation of the digital feedback gain on the HPFC of the closed-loop transfer function of the offset-correction loop. In this example, the HPFC is varied between 1.5 kHz and 12 kHz. A change in the feed-forward gain of the PGA 112 generally shifts the HPFC. However, if the change in the feed-forward gain is accompanied by a compensating change in the programmable digital gain element 132, the HPFC remains at constant frequency. In the example illustrated in FIG. 2B, the HPFC stays at 6 kHz while the PGA gain is changed from its maximum to its minimum value.

The bit-shifting operation has two advantages. First, the ability to control the bandwidth of the offset-correction loop using bit-shifting operations may facilitate speeding up and slowing down the offset-correction loop, and may thus allow to adjust the correction-loop speed based on the offset level, as explained in greater detail below. Second, the ability to adjust the feedback path gain facilitates fast compensation for any change in gain in the feed-forward path. The gain in the feed-forward path of the loop, which is controlled by the AGC, may be adjusted according to the signal level in the receiver chain. The gain changes may take place in the PGA when the receiver input is enabled and is ready to receive the desired signal.

The output word of the bit shifter may be fed into a current-steering DAC and thereby converted into an analog voltage, which is then added to the receiver input signal, for example, using a trans-impedance amplifier. The least-significant-bit (LSB) size of the DAC may be limited by the residual offset required at the output of the ADC. The dynamic range of the DAC may be set at the lower end by this LSB size and at the higher end by the full-scale static offset that the DAC needs to cancel. In this design, the LSB size may be, for example, 0.8 mV, and the full-scale offset may be 102 mV.

The static offset in the receiver may initially be large enough to cause the ADC output to saturate. To quickly cancel the greater portion of this large offset so as to bring the receiver base-band chain from a saturated condition into a linear region of operation, the offset-correction loop may initially operate at a high speed. This speed-up of the offset-correction loop may save valuable power-up time for the receiver. Once the majority of the static DC offset is cancelled, the offset-correction loop may be slowed down to lessen the probability of instability in the feedback loop. The speed-up and slow-down operations may be controlled by the window comparator 136 depicted in FIG. 1. The MAR filter 134 may average the output of the ADC 114 for a specified period of time, and the window comparator 136 may compare this average with a predetermined threshold value to indicate the level of the DC offset. The output of the window comparator 136 may be used by a bit shifter controller 138 to control the amount of bit-shifting in the programmable digital gain element 132, which in turn may set the high-pass corner of the system, thereby controlling the speed of the system.

The static DC offset cancellation may be accomplished using the maximum base-band gain, thereby providing the minimum residual DC offset at the ADC output. The AGC loop, however, may change the base-band gain in subsequent stages of operation, thereby changing the DC offset $V_{os,bb}$. To reduce the effect of any static DC offset changes caused by changes to the base-band gain, a fixed gain of, for example, 12 dB may be maintained at the input of the base-band chain. This fixed gain may be implemented without degrading the linearity of the receiver.

Once the window comparator 136 indicates that the DC offset at the ADC output has been cancelled to the desired number of LSBs, a state-machine that is part of the controller and supervises the operation of the offset-correction loop may terminate this stage of offset-correction and transition to the dynamic DC offset-cancellation stage. The static offset DAC code may be held during the next stage.

Figure 3:
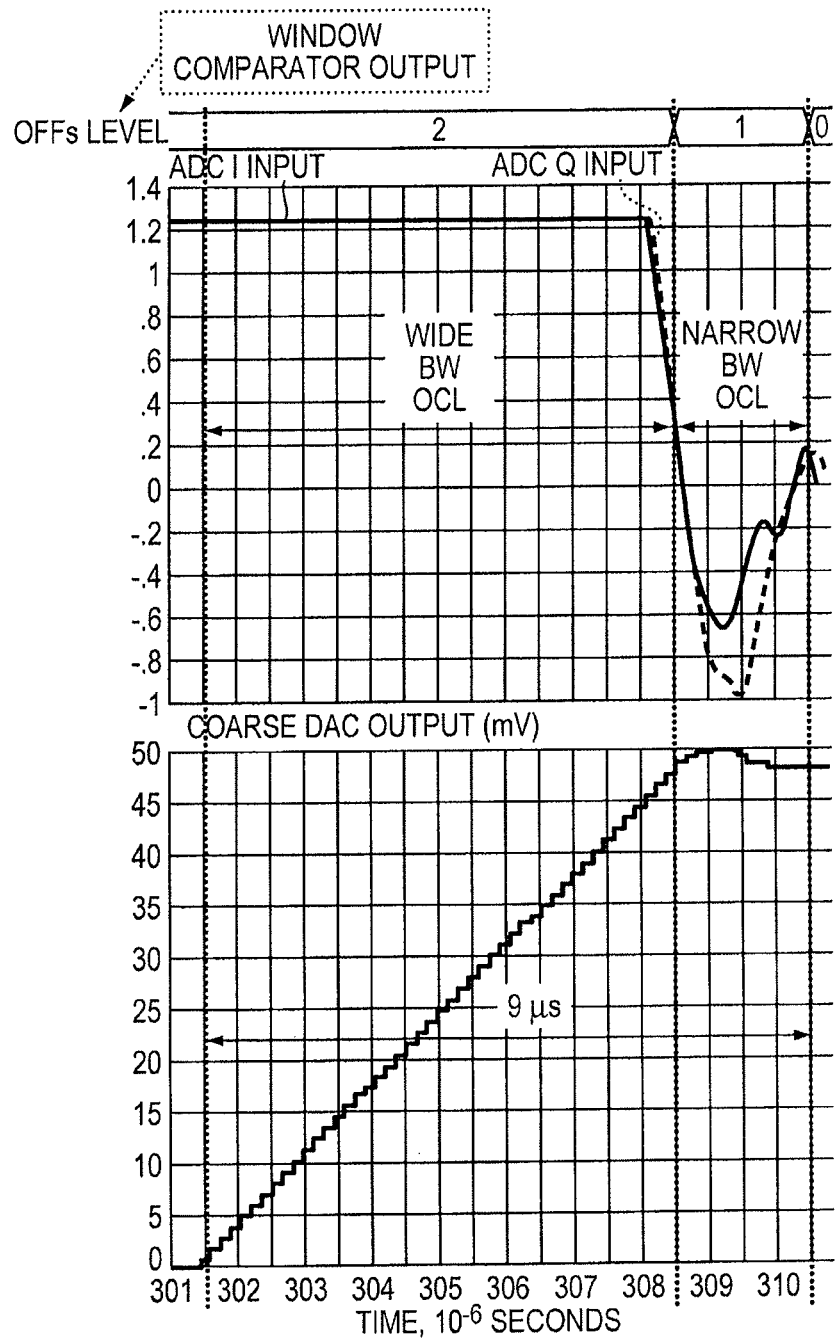
FIG. 3 is a graph illustrating static-offset cancellation in accordance with one embodiment.

FIG. 3 shows the operation of the offset-correction loop in the static offset-cancellation stage. The plot shows the output of the window comparator 136 (offset level), the input of the ADC 114 in the receiver, and the output of the coarse DAC 116 used for static offset-correction. At the start of the cancellation phase, the offset level is high; this is indicated by the window comparator output as level 2. As a result, the bandwidth of the offset-correction loop is increased to the maximum possible value until the offset level drops to the level that brings the receiver chain out of saturation. The window comparator then indicates that the offset level has dropped to a medium value, level 1. As a result, the offset-correction loop decreases the bandwidth of the loop to prevent the offset-correction loop from becoming unstable. This continues until the offset level drops to the minimum value, which is indicated by the output of the window comparator as level 0. As soon as this occurs, the state machine supervising the operation of the offset-correction loop in accordance herewith terminates this stage and moves on to subsequent stages. (Although the state machine is not shown in the figures, it is a conventional control expedient or running process programmed to operate the offset-correction loop as described herein.) In some embodiments, the overall full-scale static offset-cancellation stage may take 9 μs or less due to these speed-up mechanisms.

2. Dynamic DC-Offset-Correction Stage

Figure 4:
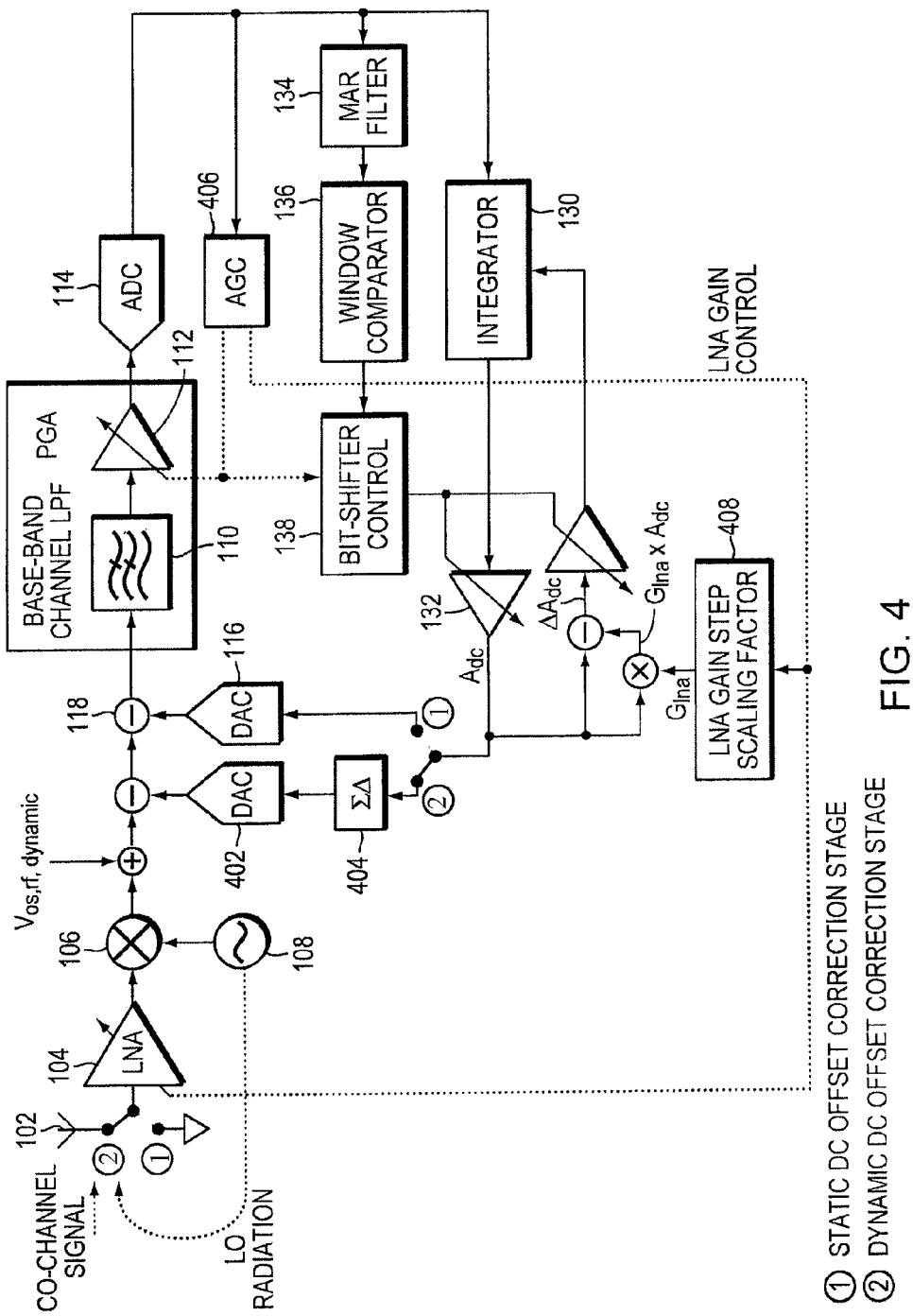
FIG. 4 is a block diagram illustrating a receiver circuit and offset-correction loop during dynamic-offset correction in accordance with one embodiment.

FIG. 4 illustrates one embodiment of a system implementing the second, dynamic DC offset-cancellation stage of the offset-correction loop. The static DC offset corrected in the first stage, as described above, is maintained during this stage using the static DC offset DAC 116. The dynamic digital offset-correction signal may be converted into an analog signal by a second DAC 402.

The DC offset $V_{os,rf}$ in the dynamic time-varying offset-correction stage may be due to LO radiation and reflection back to the receiver input, as well as possible co-channel signals. To allow this type of offset to be cancelled at the mixer output, the dynamic DC offset-cancellation stage may start by enabling the LNA 104 and allowing the system to receive an incoming signal. The dynamic DC offset in this stage may be cancelled while a signal (including a preamble thereof) is being received. As a consequence, the quantization noise of the offset-correction DAC 402 may need to be much lower than the noise contributed by the receiver chain. Preferably, the contribution of the DAC 402 to the overall noise of the receiver is negligible.

To reduce the quantization noise introduced into the receiver by DAC 402, the DAC 402 should have a high resolution. For example, the resolution required to degrade the noise of the receiver by only 0.2 dB, over the Nyquist bandwidth of the offset-correction loop (e.g., 20 kHz), may be 14 bits. The DAC 402 may be required to inject very little noise as well as to maintain its monotonicity over its operating range. A conventional current-steering DAC with these characteristics may consume a prohibitively large amount of power and silicon area. Therefore, in one embodiment, the DAC 402 is implemented as a sigma-delta-modulator DAC (i.e., a DAC having a sigma-delta modulator 404 connected to its input port).

Figure 5:
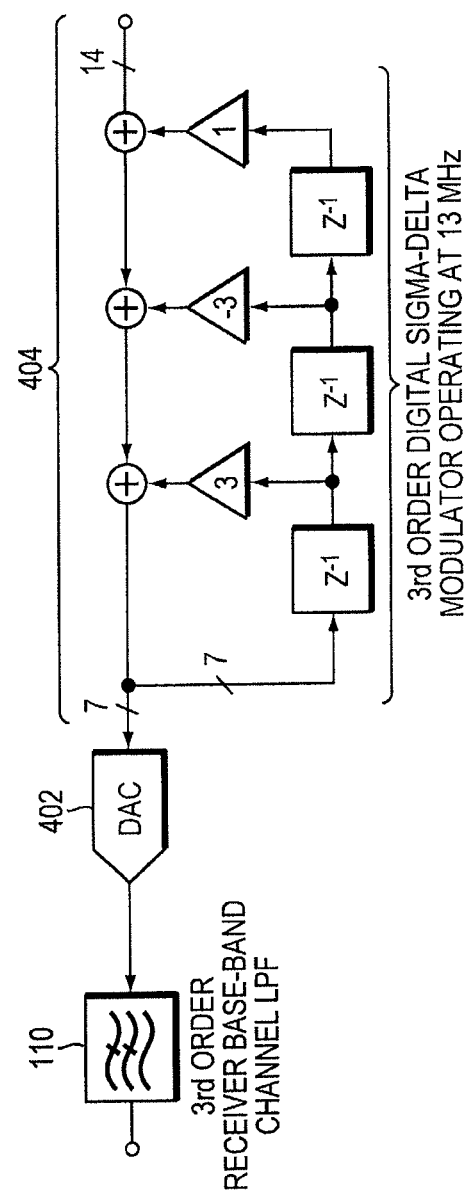
FIG. 5 is a block diagram illustrating a DAC and sigma-delta modulator for use in a dynamic offset correction loop in accordance with various embodiments.

The sigma-delta modulator may be implemented using an error-feedback architecture, which is very hardware-efficient, as depicted in FIG. 5. Sigma-delta DACs may substantially reduce the amount of analog circuitry required to implement the DAC, thereby reducing the silicon area and power required.

To meet the noise requirements, the sigma-delta modulator may be chosen to have a higher order, for example, a third order. A third-order modulator 404 may keep the in-band quantization noise low, at the expense of increasing the out-of-band quantization noise. A third-order modulator may give, for example, a 4 dB integrated noise improvement over a second-order modulator over the bandwidth of the base-band channel filter (e.g., 1.5 MHz).

In a conventional implementation, the out-of-band quantization noise may be eventually filtered from the signal by a low-pass filter. Such a low-pass filter, however, if implemented with analog components may be expensive in both silicon area and power consumed. Certain embodiments of the current invention may, therefore, not use a dedicated low-pass filter to filter the out-of-band quantization noise, but instead rely on the base-band channel filter 110 in the receive chain, acting as a filter at the desired bandwidth (e.g., 1.5 MHz). Reusing the base-band channel filter 110 may result in significantly lower area and power consumption than using a dedicated low-pass filter for the DAC 402.

The sigma-delta modulator may operate at a frequency of 13 MHz, giving an over-sampling rate of, for example, 8.67 relative to the desired signal bandwidth (e.g., 1.5 MHz). However, other appropriate operation frequencies of the sigma-delta modulator are also within the scope of embodiments of this invention. The sigma-delta DAC solution may achieve an integrated noise voltage at the base-band low-pass channel filter output that is, for example, 12 dB below that of the RF mixer. This integrated noise voltage may cause less than 0.2 dB overall degradation in the receiver noise figure. The effective number of bits of the sigma-delta DAC may be 14 bits over the Nyquist bandwidth of the offset-correction loop.

Returning to FIG. 4, the operation of the offset-correction loop is illustrated in further detail. The first step in cancelling the dynamic DC offset may be to disable the AGC system 406 and lock the receiver gains (i.e., the gains of the PGA 112 and LNA 104) at their maximum levels. During this first step, the offset-correction loop may attempt to cancel any dynamic DC offsets detected. Because the receiver is enabled, however, a strong signal could saturate the receiver and prevent the offset-correction loop from fully cancelling the dynamic DC offsets. Such a strong signal need not necessarily come from the intended transmitter because the communication system may delay the transmission of such a desired signal for a specified amount of time after the receiver is enabled. Nevertheless, a strong co-channel signal (originating from, for example, another unregulated communication system) could be present at the receiver input, causing the receiver to saturate. The offset-correction loop and AGC system 406 may have to cope with these two alternative scenarios (i.e., a scenario in which a strong co-channel signal is not present, and one in which it is), while keeping the time from powering up the receiver to starting the search process for the desired signal at a minimum.

In the first scenario, in which a strong co-channel signal is not present, the offset-correction loop may operate in a manner similar to that of the static DC offset-correction stage, as described above. The digital integrator 130 may integrate the dynamic DC offset appearing at the output of the ADC 114 and direct the signal to be bit-shifted according to the desired bandwidth. The sigma-delta modulator may take the output of the feedback gain bit-shifter 132 and truncate it to, for example, a 7-bit word, which may then be supplied as an input to the DAC. The MAR filter 134 may average the ADC samples, and the window comparator 136 may detect the level of the offset in the integrated ADC output and, accordingly, set the bandwidth of the offset-correction loop system until the offset is fully (or nearly) cancelled.

After the state machine of the offset-correction loop has detected that the offset has been substantially cancelled, the AGC system 406 may be enabled. The offset-correction loop may then reduce its bandwidth, thereby analyzing only a portion of the spectrum of the received signal and hence avoiding degradation to the signal-to-noise ratio of the received signal. For example, for a 2 Mbps Gaussian frequency-shift keying signal, the maximum high-pass filter corner of the offset-correction loop may be 2 kHz. A 250 kbps direct-sequence spread-spectrum minimum-shift keying signal may have a maximum high pass filter corner of 15 kHz.

In the second scenario, in which a strong co-channel signal is present, the offset-correction loop system may not be able to fully cancel the dynamic DC offset in the allocated time. This failure to cancel the dynamic DC offset may be due to the high signal level present at the input of the receiver, which may make the offset estimation process very long. To deal with this case, the offset-correction loop system may have a time-out period after which it stops trying to cancel the dynamic DC offset and moves to the next stage of operation—enabling the AGC system 406. The window comparator 136 may be used to indicate whether the offset has not been fully cancelled.

Once the AGC system 406 is enabled, the receiver gain may be reduced to compensate for the high co-channel signal level. In the communication systems envisioned by the implementation of the current invention, the level of an undesirable co-channel signal, received during the initial dynamic DC offset-correction stage, is generally lower than the level of the signal eventually received during the normal operation of the receiver. Therefore, the AGC system 406 may establish a higher gain in the receiver chain in the presence of the co-channel signal than it will, later on, during receipt of the desired signal. As a result, as the offset-correction loop cancels the residual dynamic DC offset (i.e., the portion of the offset that was not cancelled before the enabling of the AGC system 406), the receiver may operate at a lower gain level than that during the presence of the co-channel signal. Therefore, the offset-correction loop may exhibit an even lower residual offset during the receipt of the desired signal.

Once the AGC system 406 is enabled, the receiver may be ready to receive an incoming signal, and the offset-correction loop may reduce its bandwidth to a lower value, thereby avoiding a degradation to the signal-to-noise ratio of the received signal. If the level of the incoming signal changes, however, the AGC system 406 may change the gain of the LNA 104 in response. Doing so, however, may change the level of the dynamic DC offset, because the majority of the local-oscillator signal that causes such offsets may pass through the LNA 104. Because the LNA gain updates may occur nearly instantaneously, the offset-correction loop, due to its narrow bandwidth, may not be able to quickly cancel a new offset level. This situation may cause that the AGC system to detect a high offset level at the output of the ADC 114, thereby confusing its signal detection algorithm. As a result, the AGC may arrive at an incorrect gain level. Because the AGC system 406 may be required to re-adapt to a new gain level in a short amount of time (e.g., less than 20 μs), it may not be possible to stop the AGC, cancel the offset, and then re-start the AGC for every gain update.

Therefore, in some embodiments, the offset-correction loop is provided with an estimate of the new dynamic DC offset level when the LNA gain changes. This estimate may be set equal to a scaling of the existing offset level, before an LNA gain change takes place, in accordance to the current LNA gain step. Whenever an LNA gain update occurs, the offset-correction loop bandwidth may be increased such that any error in the offset estimate may be quickly cancelled before the AGC reacts to the new signal level. This bandwidth extension may take place during the LNA gain update and may be controlled by a time-out period.

FIG. 4 shows one embodiment of an implementation of the scaling mechanism. In this embodiment, an estimate of the dynamic DC offset is provided when a change in the gain of the LNA 104 occurs. This implementation may be achieved by adding an estimate of the dynamic offset ($\Delta A_{dc}$) to the current dynamic offset DAC code ($A_{dc}$). The estimate $\Delta A_{dc}$ may be computed by scaling $A_{dc}$ with the current LNA gain step ($G_{lna}$) and subtracting $A_{dc}$ from the result (i.e, $\Delta A_{dc} = G_{lna} \times A_{dc} - A_{dc}$). Thus, for example, if the LNA gain drops by 12 dB, $A_{dc}$ may be scaled by a factor of ¼ and $A_{dc}$ is subtracted from this value, yielding a $\Delta A_{dc}$ value of $-\frac{3}{4} \times A_{dc}$.

$\Delta A_{dc}$ may then be inversely scaled with the current feedback gain (i.e., the current bit-shifting setting) in the feedback path and added to the signal in the offset-correction loop integrator 130. In one embodiment, the resulting effect is adding the $\Delta A_{dc}$ value to the current dynamic offset DAC code, $A_{dc}$, every time an LNA gain change occurs, thereby scaling the current value of the offset by the exact amount of the LNA gain step. Because the addition of $\Delta A_{dc}$ occurs in the integrator, any errors in the estimation of the scaling factor by which the dynamic DC offset is scaled may be eventually corrected by the offset-correction loop. The error may be minimized by providing a look-up table 408 for the low-noise amplifier gain step scaling factors. The values in the look-up table 408 may be adjusted based on silicon results.

After $\Delta A_{dc}$ has been applied to the integrator, the bandwidth of the offset-correction loop may be subsequently increased for a period of time to correct for any errors made in the estimation of $\Delta A_{dc}$. In one embodiment, the offset-correction loop corrects the errors before the AGC reacts.

The bandwidth of the offset-correction loop may also be maintained during a change in the gain of the PGA 112. This bandwidth maintenance may be accomplished by updating the feedback path gain (e.g., bit-shifting by, for example, 2) in response to a change in the PGA gain step (of, for example, 6 dB). This implementation may simplify the offset-correction loop system hardware if the feedback path gain of the offset-correction loop is not updated when the PGA gain steps are, for example, 3 dB steps.

Updates to the digital gain at the integrator output may cause steps (e.g., jumps) at the output of the offset-correction DAC, thereby corrupting the signal being received. Any such steps may prevent the AGC system 406 from correctly determining the signal level. In one embodiment, the DAC steps may be prevented by adding, in the integrator 130, a value equivalent to the step induced by updating the digital gain. As a result, the step may be hidden from the feedback system when the offset-correction loop bandwidth changes.

In addition, changes in the PGA gain steps may cause changes in any static DC offsets present in the system. These changes in the static DC offsets may be minimized by performing the static DC offset cancellation phase at the maximum PGA gain setting, thereby minimizing the residual offset during the normal operating phase of the receiver because the PGA 112 may then be operating at lower settings. Furthermore, the gain line-up in the receiver may be chosen such that the gain stage at the input of the base-band chain is fixed at, for example, 12 dB. Having a fixed gain stage at the base-band chain may reduce the input-referred static DC offset; the small residual offset at lower PGA steps may not significantly affect the total input-referred DC offset.

Figure 6A:
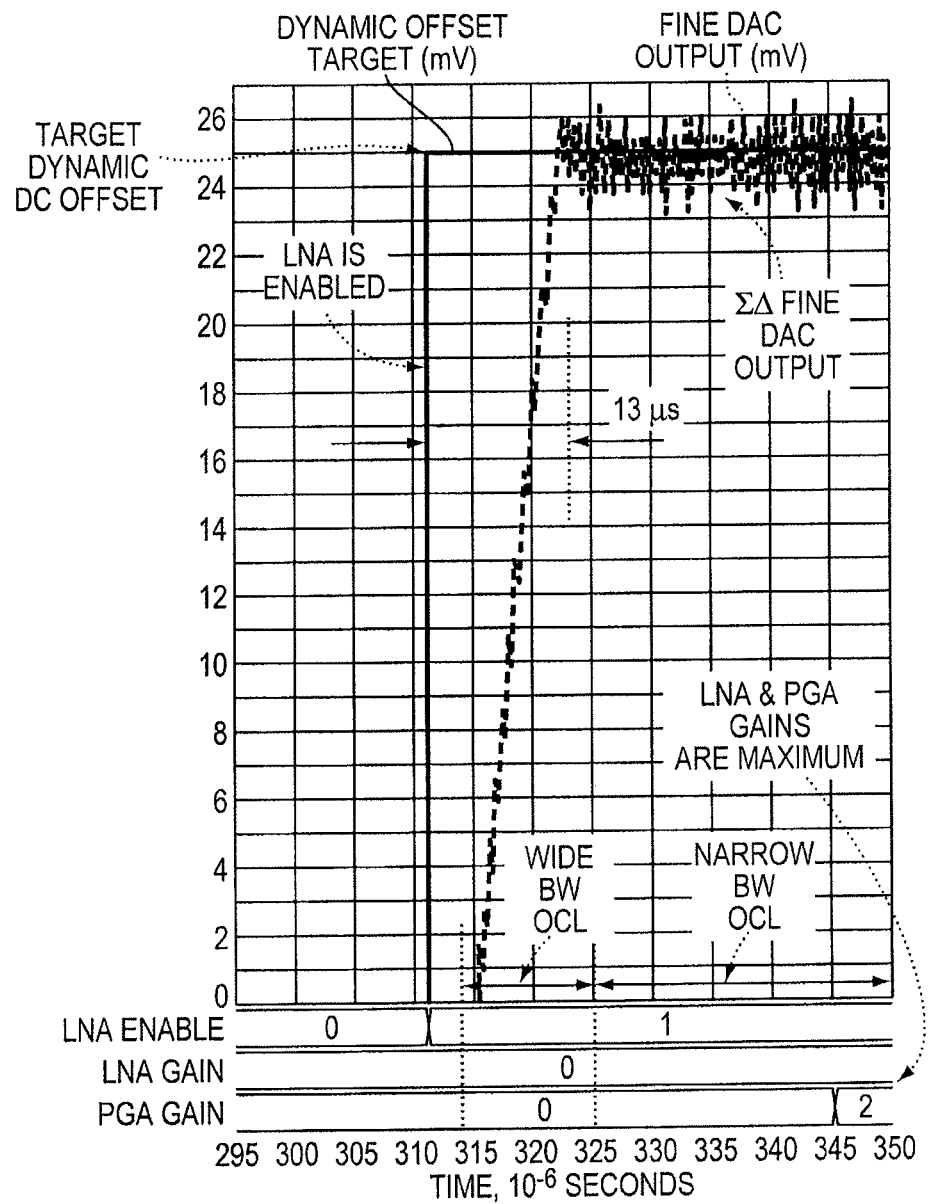
FIGS. 6A-6B are graphs illustrating various steps of dynamic-offset cancellation in accordance with one embodiment.
Figure 6B:
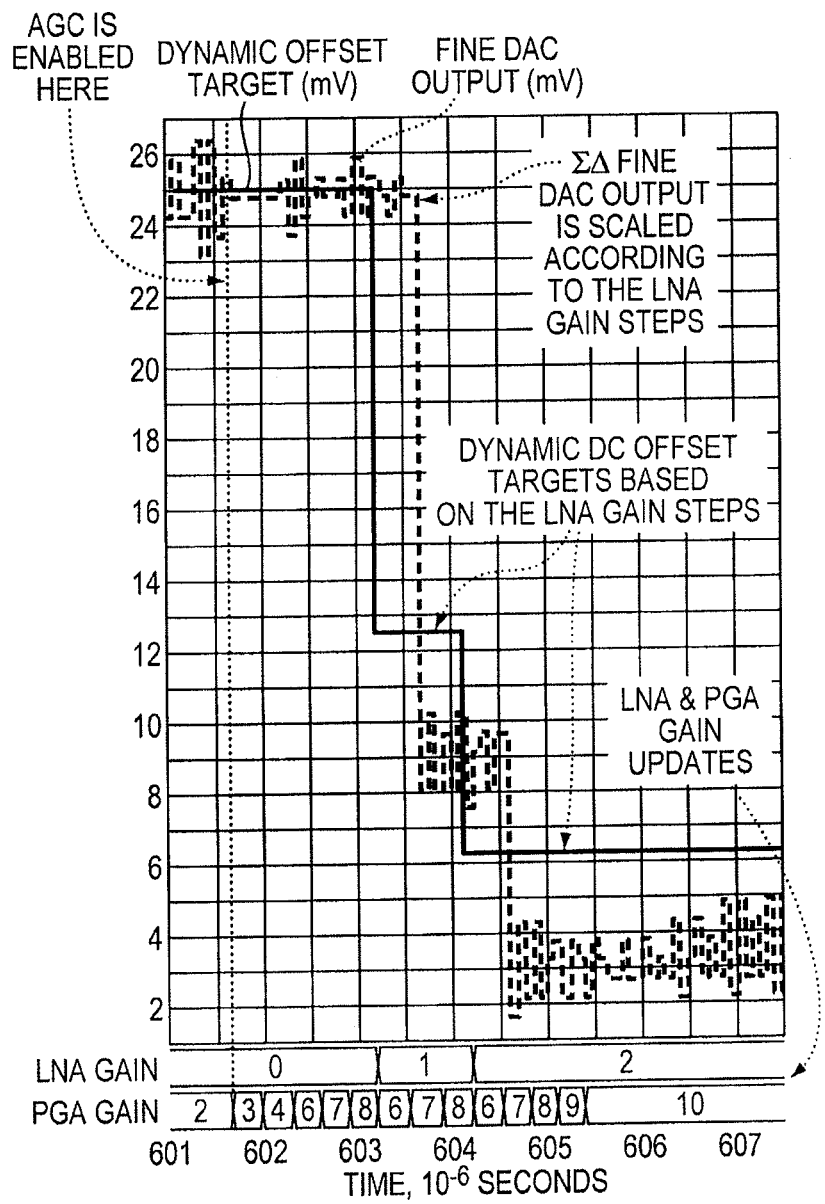
Figure 6C:
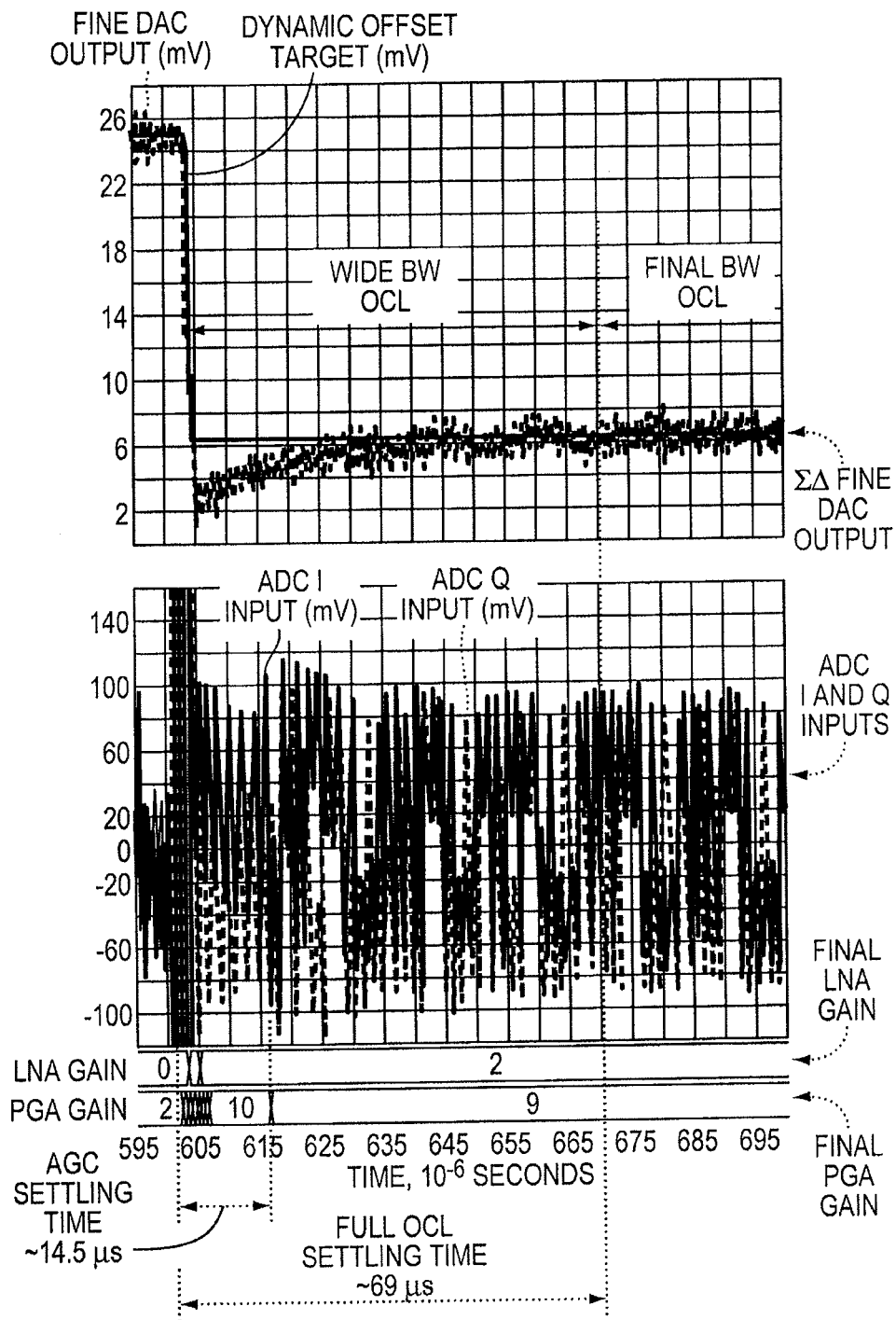
FIGS. 6C-6D are graphs illustrating the interaction between an automatic gain control and an offset-correction loop when LNA gain changes are taken into account in accordance with one embodiment, or are not taken into account, respectively.

FIGS. 6A-6C illustrate the operation of the dynamic offset-correction loop in its various stages. FIG. 6A shows the initial stages of the dynamic offset-correction loop. After the LNA 104 is enabled, a dynamic DC offset appears at the RF mixer output, and the offset-correction loop starts to cancel the dynamic DC offset. The figure shows the target offset to be cancelled as well as the output of the offset-correction sigma-delta DAC. The AGC 406 is not enabled while the offset-correction loop is initially cancelling the dynamic DC offset, and the gains of the PGA 112 as well as the LNA 104 are held at the maximum value. The offset-correction loop starts the cancellation phase with a very wide bandwidth to quickly cancel the dynamic DC offset. The residual dynamic offset is measured using the MAR filter 134, and once the dynamic DC offset level drops below a specified level, the offset-correction loop bandwidth is reduced to the minimum value which is suitable for the signal being received.

If the dynamic DC offset has been reduced below a specified threshold, or after a specified time-out period, the offset-correction loop state machine enables the AGC system 406. Once the AGC system 406 is enabled, and if a desired signal is present at the receiver input, the AGC 406 will update the gains of the LNA 104 and PGA 112 to adjust the total receiver gain. FIG. 6B shows a simulation for a −50 dBm signal at the receiver input shortly present before the AGC is enabled. Once the AGC is enabled and starts to acquire the signal, LNA as well as PGA gain changes take place as shown. During the LNA gain updates, the output of the sigma-delta offset-correction DAC 402 is scaled accordingly to minimize the settling time of the offset-correction loop, and hence to allow the AGC to predict the correct signal level while operating simultaneously with the offset-correction loop. As shown in FIG. 6B, there is an error between the target value of the dynamic offset and that of the sigma-delta DAC. This error is due to the non-ideal scaling of the dynamic DC offset with the LNA gain change. To allow the offset-correction loop to settle this error as fast as possible, the offset-correction loop bandwidth is increased whenever an LNA gain change occurs. In addition, the offset-correction loop bandwidth is kept at the extended bandwidth for a time-out period following every LNA gain change. This guarantees that the error resulting from the scaling mechanism relative to the target DC offset is cancelled within the given time-out period. After this time-out period, the offset-correction loop bandwidth reduces back to the bandwidth required for signal reception.

FIG. 6C shows the overall settling performance of the offset-correction loop, indicating the wide bandwidth of the loop during and after the LNA gain changes as well as the final offset-correction loop bandwidth. It also shows the waveforms of the received signal at the ADC input, indicating no distortion of the signal due to the sigma-delta offset-correction DAC in the dynamic cancellation stage.

Figure 6D:
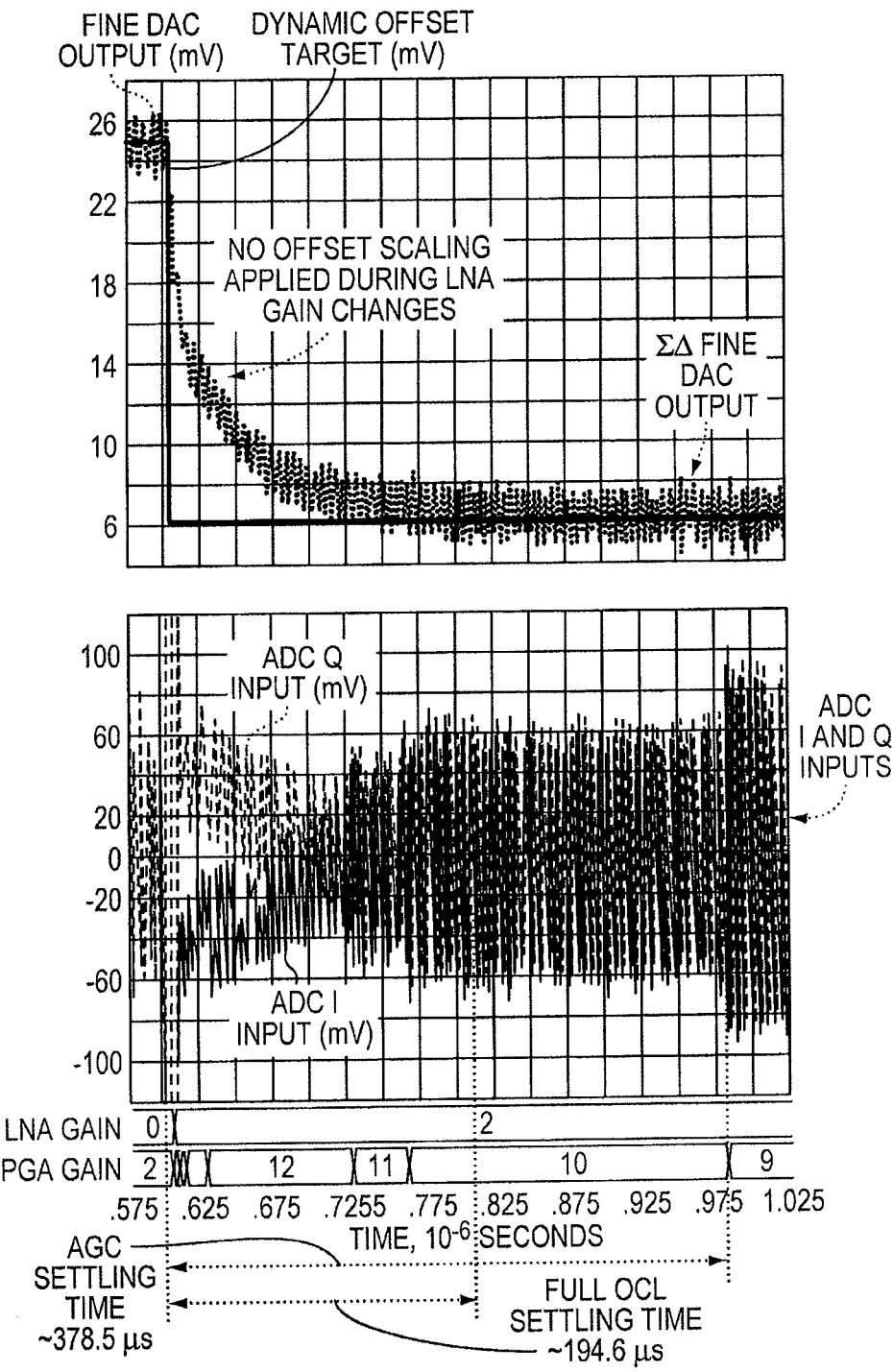

FIG. 6D shows a simulation of an offset-correction loop that does not utilize the scaling mechanism of the DC offsets according to the LNA gain changes, but does use the bandwidth extension scheme after an LNA gain change. A comparison of FIGS. 6C and 6D shows that, without the scaling mechanism, the settling time of the offset-correction loop increases by more than a factor of 2 and, more importantly, that the AGC settling time, as a result, increased by more than a factor of 26 because the AGC system makes an error due to the fact that the DC offset in the receiver was not fully cancelled while the AGC was making a decision on the receiver gain level.

Although the present invention has been described with reference to specific details, it is not intended that such details should be regarded as limitations upon the scope of the invention, except as and to the extent that they are included in the accompanying claims.

What is claimed is:

1. A method for offset cancellation in a receiver, the method comprising:
cancelling a static offset using an offset-correction loop during a first cancellation stage, wherein a switch electrically couples an input of a low-noise amplifier (LNA) of the receiver to a ground potential during the first cancellation stage;
enabling the LNA of the receiver by electrically coupling the input of the LNA to an antenna via the switch; and
while the LNA is enabled such that the input of the LNA is electrically coupled to the antenna, generating a dynamic offset value and cancelling the dynamic offset based at least partly on the dynamic offset value using the offset-correction loop during a second cancellation stage following the first cancellation stage.

2. The method of claim 1, wherein at least one of the cancellation stages comprises controlling a bandwidth of the offset-correction loop by adjusting a feedback path gain.

3. The method of claim 2, wherein adjusting the feedback path gain is based at least in part on a magnitude of at least one of the static offset or the dynamic offset.

4. The method of claim 2, wherein adjusting the feedback path gain reduces a time period associated with cancelling at least one of the static offset or the dynamic offset.

5. The method of claim 2, wherein adjusting the feedback path gain reduces an acquisition time of an incoming wireless signal.

6. The method of claim 1, further comprising disabling the LNA before entering into the first cancellation stage.

7. The method of claim 1, wherein at least one analog circuit element is used to cancel the dynamic offset.

8. The method of claim 1, further comprising maintaining, during the second cancellation stage, a static offset-correction determined in the first cancellation stage.

9. The method of claim 1, wherein cancelling the dynamic offset comprises adjusting a feedback-path gain of the offset-correction loop based at least in part on a change in a feed-forward gain of the receiver.

10. The method of claim 1, wherein cancelling the dynamic offset comprises estimating a change in the dynamic offset due to a change in a gain of the LNA and compensating for the estimated change in the dynamic offset.

11. The method of claim 1, wherein cancelling the dynamic offset comprises continuously cancelling the dynamic offset.

12. The method of claim 11, wherein continuously cancelling the dynamic offset comprises using a sigma-delta digital-to-analog converter (DAC).

13. The method of claim 1, wherein cancelling the dynamic offset comprises converting an analog signal to a digital signal.

14. The method of claim 1, wherein the dynamic offset is cancelled during a preamble of a received signal.

15. A system for offset cancellation in a receiver, the system comprising:
an offset-correction circuit configured to:
cancel a static offset of the receiver during a first cancellation stage;
generate, in a continuous offset-correction loop during a second cancelation stage, an estimate of a dynamic offset based at least partly on an estimate of a gain change of a low-noise amplifier (LNA) of the receiver, wherein an input of the LNA is electrically coupled to an antenna during the second cancellation stage, and wherein the second cancellation stage follows the first cancellation stage; and
cancel a dynamic offset of the receiver during the second cancellation stage based at least partly on the estimate of the dynamic offset; and
a controller configured to transition the offset-correction circuit from the first cancellation stage to the second cancellation stage.

16. The system of claim 15, wherein the controller is configured to transition the offset circuit based at least in part on a magnitude of at least one of the static offset or the dynamic offset.

17. The system of claim 15, wherein the offset-correction circuit comprises circuitry configured to control the bandwidth of the offset-correction loop based at least in part on a magnitude of the offset.

18. The system of claim 15, wherein the offset-correction circuit further comprises a first digital-to-analog converter (DAC) configured to cancel the static offset of the receiver during the first cancellation stage and a second DAC configured to cancel the dynamic offset of the receiver during the second cancellation stage.

19. The system of claim 18, wherein the first DAC has a lower effective resolution than the second DAC.

20. The system of claim 18, further comprising a receiver base-band channel filter configured to filter out-of-band quantization noise of the second DAC.

21. The system of claim 15, wherein the offset-correction circuit comprises a multiplier configured to adjust a feedback path gain of the offset-correction loop.

22. The system of claim 21, wherein the multiplier is configured to adjust the feedback path gain based at least in part on a change in a feed-forward path gain of the receiver.

23. The system of claim 21, wherein the multiplier comprises a bit shifter.

24. A method for cancelling an offset in a receiver using an offset-correction loop, the method comprising:
converting an analog signal of the receiver to a digital signal;
integrating the digital signal;
while the receiver receives an input signal, measuring a magnitude of a dynamic offset level in the digital signal;
scaling the integrated digital signal based at least in part on the magnitude of the dynamic offset level, thereby changing a bandwidth of the offset-correction loop;
converting the scaled integrated digital signal to an analog offset-correction signal; and
combining the analog offset-correction signal with the input signal received by the receiver, thereby cancelling at least a portion of the offset in the receiver.

25. The method of claim 24, wherein scaling the integrated digital signal comprises bit-shifting the integrated digital signal.

26. The method of claim 24, wherein measuring the magnitude of the offset level in the digital signal comprises measuring a moving average of the digital signal.

27. The method of claim 26, further comprising comparing the moving average with a predetermined value to determine a degree of scaling the integrated digital signal.

28. The method of claim 24, wherein scaling the integrated digital signal is further based on a change in the feed-forward gain of the receiver.

29. The method of claim 24, further comprising:
estimating a change in the dynamic offset caused by a change in a gain of an LNA of the receiver; and
adjusting the integrated digital signal based on the estimate.

30. The method of claim 29, further comprising widening the bandwidth of the offset-correction loop when adjusting the integrated digital signal to account for an error in the estimate.

31. The method of claim 24, further comprising:
alternately cancelling an offset in an I channel of the receiver and a Q channel of the receiver.

32. The method of claim 24, further comprising filtering out-of-band quantization noise in the analog offset-correction signal.

33. A system for offset cancellation in a receiver, the system comprising:
an analog-to-digital converter (ADC) configured to convert an analog signal of the receiver to a digital signal;
an integrator configured to integrate the digital signal, thereby producing an integrated digital signal;
an averaging circuit configured to compute an average of the digital signal;
a programmable gain element configured to generate a dynamic offset digital-to-analog converter (DAC) code by scaling the integrated digital signal based at least in part on the average of the digital signal, wherein the programmable gain element is configured to generate the dynamic offset DAC code while the receiver receives an input signal;
a digital-to-analog converter (DAC) configured to convert the dynamic offset DAC code into an analog offset-correction signal; and
an adder configured to combine the analog offset-correction signal with the input signal received by the receiver, thereby cancelling at least a portion of the offset in the receiver.

34. The system of claim 33, wherein the programmable gain element is a multiplier.

35. The system of claim 34, wherein the multiplier comprises a bit shifter.

36. The system of claim 33, wherein the programmable gain element is configured to scale the integrated digital signal based at least in part on a signal generated by an automatic gain control unit.

37. The system of claim 33, wherein the averaging circuit comprises a moving average filter.

38. The system of claim 37, further comprising a window comparator configured to compare an output of the moving average filter with a predetermined value to determine a degree of scaling the integrated digital signal.

39. The system of claim 33, wherein the adder comprises a trans-impedance amplifier.

40. The system of claim 33, further comprising a receiver base-band channel filter configured to filter out-of-band quantization noise of the DAC.

41. The system of claim 33, further comprising a sigma-delta modulator.

42. The system of claim 41, wherein an input signal of the sigma-delta modulator is scaled to prevent saturation of the sigma-delta modulator.

43. The system of claim 41, wherein the sigma-delta modulator is a third-order modulator.

44. The system of claim 41, wherein the sigma-delta modulator is an error-feedback sigma-delta modulator.

45. The system of claim 33, wherein the integrator comprises a first input terminal electrically coupled to the ADC, a second input terminal electrically coupled to a second programmable gain element configured to provide an estimate of a new dynamic direct current DC) offset level, and an output terminal electrically coupled to the programmable gain element.

46. A wireless communication receiver system comprising:
a receiver circuit comprising at least an antenna configured to receive a radio-frequency input signal, a switch, and a low-noise amplifier (LNA);
an offset-correction circuit configured to cancel a static offset of the receiver system during a first cancellation stage and a dynamic offset of the receiver system during a second cancellation stage following the first cancellation stage, wherein the switch is configured to electrically couple a ground potential to an input of the LNA during the first cancellation stage and electrically couple the antenna to the input of the LNA during the second cancellation stage, and wherein the offset-correction circuit is further configured to generate a dynamic offset value while the antenna is electrically coupled to the input of the LNA and to cancel the dynamic offset during the second cancellation stage based at least partly on the dynamic offset value; and a controller configured to transition the offset-correction circuit from the first cancellation stage to the second cancellation stage.

47. The wireless communication receiver system of claim 46, wherein the system is a mobile phone.

48. The wireless communication receiver system of claim 46, wherein the system is a wireless sensor network.

49. The wireless communication receiver system of claim 46, wherein the system is a wireless local area network.

* * * * *